United States Patent
Buschmann et al.

(10) Patent No.: US 12,115,887 B2
(45) Date of Patent: Oct. 15, 2024

(54) CONTROL PLATFORM WITH A SEAT CONSOLE FOR A CONSTRUCTION MACHINE

(71) Applicant: JOSEPH VOEGELE AG, Ludwigshafen/Rhein (DE)

(72) Inventors: Martin Buschmann, Neustadt (DE); Ralf Weiser, Ladenburg (DE); Maximilian Theobald, Ludwigshafen (DE)

(73) Assignee: Joseph Voegele AG, Ludwigshafen/Rhein (DE)

( * ) Notice: Subject to any disclaimer, the term of this patent is extended or adjusted under 35 U.S.C. 154(b) by 367 days.

(21) Appl. No.: 17/574,774

(22) Filed: Jan. 13, 2022

(65) Prior Publication Data
US 2022/0219573 A1    Jul. 14, 2022

(30) Foreign Application Priority Data
Jan. 13, 2021  (EP) ..................... 21151352

(51) Int. Cl.
*B60N 2/14* (2006.01)
*B62D 33/06* (2006.01)
*B60N 2/02* (2006.01)

(52) U.S. Cl.
CPC .......... *B60N 2/14* (2013.01); *B62D 33/0617* (2013.01); *B60N 2/02246* (2023.08)

(58) Field of Classification Search
CPC ...... B60N 2/14; B60N 2/062; B62D 33/0617; B62D 33/0625; B62D 33/073; E01C 2301/30

USPC ................. 296/65.11, 65.12, 190.05, 190.08
See application file for complete search history.

(56) References Cited

U.S. PATENT DOCUMENTS

| | | | |
|---|---|---|---|
| 5,664,909 A | 9/1997 | Lindgren et al. | |
| 5,921,340 A * | 7/1999 | Abels .................... | B60N 2/38 180/326 |
| 8,167,080 B2 * | 5/2012 | Ruhter ................... | E02F 9/16 180/334 |
| 9,073,460 B2 | 7/2015 | Herzberg | |
| 9,783,056 B2 * | 10/2017 | Klein .................. | E02F 9/2004 |

(Continued)

FOREIGN PATENT DOCUMENTS

| | | | |
|---|---|---|---|
| DE | 102007023568 B3 * | 12/2008 | .............. B60N 2/14 |
| DE | 10 2015 012560 A1 | 4/2016 | |

(Continued)

OTHER PUBLICATIONS

Machine Translation of DE102007023568 (Year: 2024).*

(Continued)

*Primary Examiner* — Jason S Morrow
(74) *Attorney, Agent, or Firm* — Brooks Kushman P.C.

(57) ABSTRACT

A control platform for a construction machine, in particular for a road finishing machine or a feeder vehicle, comprising a structural element and a seat console which includes a console bottom and a seat. The seat console includes a rotary mechanism by which the seat is mounted to be rotatable relative to the console bottom. The seat console includes a first and a second linear shifting mechanism by which the seat is mounted on the console bottom to be movable in a first and a second direction. The seat console is hinged to the structural element by a swivel mechanism to be swivable relative to the structural element.

20 Claims, 4 Drawing Sheets

(56) References Cited

U.S. PATENT DOCUMENTS

| | | | |
|---|---|---|---|
| 10,391,983 B2 | 8/2019 | Klein et al. | |
| 10,486,554 B2 * | 11/2019 | Napau | B60N 2/06 |
| 10,994,708 B2 * | 5/2021 | Klein | B60T 7/02 |
| 2007/0228795 A1 | 10/2007 | Boehme et al. | |
| 2016/0096544 A1 | 4/2016 | Klein et al. | |
| 2017/0001540 A1 | 1/2017 | Reif et al. | |
| 2017/0088103 A1 | 3/2017 | Klein et al. | |
| 2022/0161694 A1 * | 5/2022 | Numajiri | B60N 2/14 |

FOREIGN PATENT DOCUMENTS

| | | |
|---|---|---|
| EP | 1 839 934 A2 | 10/2007 |
| EP | 1 839 934 A3 | 2/2010 |
| EP | 3 150 449 A1 | 4/2017 |
| JP | S62055304 A | 3/1987 |
| JP | S62172795 U | 11/1987 |
| JP | H08-209618 A | 8/1996 |
| JP | 2000-328516 A | 11/2000 |
| JP | 2010-209636 A | 9/2010 |
| JP | 2013-221398 A | 10/2013 |
| WO | 2017/214963 A1 | 12/2017 |

OTHER PUBLICATIONS

Japanese Office Action (with English Machine Translation) Dated Jun. 30, 2023, Application No. 2022-002017, 10 Pages.
European Search Report Dated Jun. 18, 2021, Application No. 21151352.8-1002, Applicant Joseph Voegele AG, 7 Pages.
Japanese Office Action (with English Machine Translation) Dated Jan. 6, 2023, Application No. 2022-002017, 11 Pages.

* cited by examiner

CONTROL PLATFORM WITH A SEAT CONSOLE FOR A CONSTRUCTION MACHINE

CROSS-REFERENCE TO RELATED APPLICATIONS

This application claims foreign priority benefits under 35 U.S.C. § 119(a)-(d) to European patent application number EP 21151352.8, filed Jan. 13, 2021, now European patent No. EP 4029727 B1, issued Jun. 12, 2024, which is incorporated by reference in its entirety.

TECHNICAL FIELD

The present disclosure relates to a control platform for a construction machine which can in particular be a road finishing machine or a feeder vehicle with an adjustable seat.

BACKGROUND

Construction machines, in particular road making machines, such as road finishing machines or feeder vehicles, usually have a control platform on which a control panel for controlling the construction machine and at least one driver seat are arranged and on which one or more operators or drivers stay during the operation. For a better overview and coordination, the control platform is often embodied to be open, that means not like a cabin, but has a roof for weather protection which spans the control platform. The control platform is often located at an elevated position on the construction machine, and railings, grids or combined elements with a safety glass are usually attached at the sides of the control platform as a fall protection. For an operator who is located on the control platform, it can make sense to take different locations or sitting positions during the respective different operating modes during the working operation to have an optimal overview of the happenings in each case. It may thus be helpful, for example, to have a good view to the front during the material transfer from a truck to the road finishing machine, and in the installation of the road pavement with changing edge sections, a good view to the side onto the installation edge can be advantageous.

Former adjusting mechanisms of a driver seat only have restricted adjusting possibilities so that the driver often had to get out of the seat and even had to lean laterally over the fall protection.

SUMMARY

It is an object of the disclosure to provide a control platform with a seat with improved adjusting possibilities.

A control platform according to the disclosure for a construction machine, in particular for a road finishing machine or a feeder vehicle, comprises a structural element and a seat console which includes a console bottom and a seat. The seat console includes a rotary mechanism by which the seat is mounted to be rotatable relative to the console bottom. The seat console includes a first and a second linear shifting mechanism by which the seat is mounted on the console bottom to be shiftable into a first and a second direction. The seat console is hinged to the structural element by means of a swivel mechanism to be swivable relative to the structural element.

The structural element can be, for example, a front or lateral wall of the control platform, or the bottom or a part of the bottom of the control platform. Equally, the structural element can be an additional part which in particular serves as a reinforcement which is embodied, for example, at an inner wall of the control platform or at the bottom. An essentially vertical component, such as, for example, an angular or circular cylindrical column which is connected with the bottom or a wall of the control platform, may also be provided as a structural element.

The seat can now be shifted in a plane in parallel to the bottom of the control platform in the X and Y directions and thus be optimally positioned corresponding to a respective activity of the operator. Thus, in particular by the movability of the seat, the sitting position may be adjusted in response to the height of the operator such that e.g., a control panel or further operational controls can be easily reached. The rotating means permits the rotation of the seat about the vertical axis whereby in particular a view and communication towards the rear side of the finishing machine are facilitated. By the swiveling capacity of the seat console, in particular the view to the front can be adapted and thus be improved.

In an advantageous embodiment, the first linear shifting mechanism comprises a first rail system, and the second linear shifting mechanism comprises a second rail system, the first and the second rail systems being arranged perpendicularly with respect to each other. Such an arrangement is mechanically stable, and all points within the maximum shifting distances can be reached. Usually, the rail systems are arranged one upon the other.

Suitably, the first rail system is arranged to be parallel to a longitudinal axis of the control platform and thus to a direction of travel of the construction machine when the swivable seat console is in a first position. The "first position" can be, for example, referred to as a position not swiveled to the outside. Thus, by the first rail system, the longitudinal position of the seat can be adjusted and, for example, the distance to a control panel which is firmly arranged at a front inner side of the control platform can be adjusted. Additionally, the second rail system can adjust a position of the seat in the lateral position to easily reach certain elements of the control panel which are important for a respective activity. The adjustment here referred to as second rail system also serves to move the seat as close as possible to the lateral fall protection (railing, safety glass, etc.), so that the driver can easily lean over it and can view the front region of the finishing machine and the construction site (directional indicator, material transfer, etc.).

Ideally, one axis of rotation of the rotary mechanism and one swiveling axis of the swivel mechanism are arranged offset with respect to each other. In this way, the seat console can be swiveled as a whole and the driver seat, and thus the viewing direction of the operator, can be adjusted independent of the position of the seat console. Thus, for example, the viewing direction in the direction of travel can be maintained.

Suitably, the first and/or the second shifting mechanism and/or the rotary mechanism and/or the swivel mechanism can each be arrested in at least one position. To this end, an arresting mechanism can be provided which can be released manually, for example, by means of a lever.

In a preferred variant, the seat console is swivable relative to the structural element within a range of 0 to 45 degrees. A lateral swiveling to the outside by up to 90 degrees would also be conceivable.

In a further variant, the rotary mechanism is arranged such that its axis of rotation is located offset from the center of the seat so that it is mounted to be eccentrically rotatable. In this way, lateral elements of a control panel can be easily reached. In addition, the control panel could be arranged in a bow around the seat. Moreover, sitting onto the seat and getting off the seat can still be easily possible since a sufficient distance to the lateral elements of the control panel can be maintained.

In an advantageous variant, the seat console comprises a control panel. Thus, the seat console can be swiveled including the control panel, and the operator on the seat can still easily reach the operational controls to control the machine. However, it is conceivable that the control panel is firmly arranged at an element of the control platform or separately from the seat console to be rotatable at an element of the control platform. The control panel can equally be rotatably arranged at the seat console.

In a suitable variant, the console bottom includes two or more levels which are arranged at different heights with respect to each other. For example, the seat including the first and second shifting mechanisms and the rotary mechanism can be arranged at an elevation of the console bottom. Thus, sufficient freedom is provided for the operator's legs to the bottom if he can rest his feet on a lower level.

In another embodiment, the console bottom has a shape tapering at least on one side from a rear end of the seat console to the swivel mechanism. So, the dimensions of the console bottom can be limited to a minimum required for mechanical stability. Thus, on the one hand, material is saved and the region of the bottom of the control platform which is covered by the console bottom or over which the same passes during the swiveling process, is minimized. Thus, the free regions can be provided for other function elements of the control platform. Moreover, persons located on the control platform are less disturbed during a swiveling process.

Ideally, the seat console is embodied to be freely suspended in a rear half. That means, in a rear region, no rollers, slide rails or the like are provided as bearings. In particular, the seat console can be exclusively mounted in the swivel mechanism. Thus, material is saved, and the manufacturing efforts are reduced. In addition, a risk of injury during the swiveling process is reduced.

Preferably, the swivel mechanism is arranged such that the seat console can be swiveled at least partially to the outside over an outer edge of a bottom of the control platform. Thus, the operator's view to the front, to the back and also to the side onto the installation edge can be clearly improved. In particular the view to the front, past the vehicle body parts, is improved. In particular, the driver does no longer have to stand up and lean to the outside out of the control platform.

In a preferred embodiment, an essentially vertical wall structure is embodied at the seat console which is provided as a lateral delimitation of the control platform. This wall structure which serves as a fall protection is swivable with the seat console. The wall structure is ideally designed and arranged such that it represents a part of the rest of the fall protection of the control platform when the seat console is not swiveled to the outside, that means when it is aligned to be flush with the fall protection. Even if the seat console is swiveled to the outside, the wall structure still fulfills the purpose of the fall protection. The wall structure can be a grid, a railing, a safety glass pane, a plastic element or the like, or combinations thereof. It is conceivable that the wall structure is additionally hinged to a structural element of the control platform.

In a suitable variant, a motor drive is provided at least for one of the first or second shifting mechanism, the rotary mechanism, or the swivel mechanism. Thus, the respective setting can be comfortably effected without any expenditure of force. To this end, corresponding operational controls, such as buttons or keys, can be provided at the seat, at the control panel, or at another point.

In a preferred variant, at least one of the settings of the first or second shifting mechanism or of the rotary mechanism or the swivel mechanism can be automatically adjusted. A position of an individual adjusting mechanism can be selected, for example, by pressing a button once or several times, or by adjustment at a display or the like. Equally, a combination of positions of several adjusting mechanisms can be adjusted by the press of a button or a selection in an operating menu. For example, that the seat console is maximally swiveled to the outside and the seat is maximally shifted to the outside can be stored as a selectable presetting.

The disclosure moreover relates to a construction machine, in particular a road finishing machine or feeder vehicle, comprising a control platform according to one of the preceding embodiments.

BRIEF DESCRIPTION OF THE DRAWINGS

In the following, exemplified embodiments of the disclosure are described more in detail with reference to the figures.

Corresponding components are always provided with the same reference numerals in the figures.

DETAILED DESCRIPTION

Figure 1:
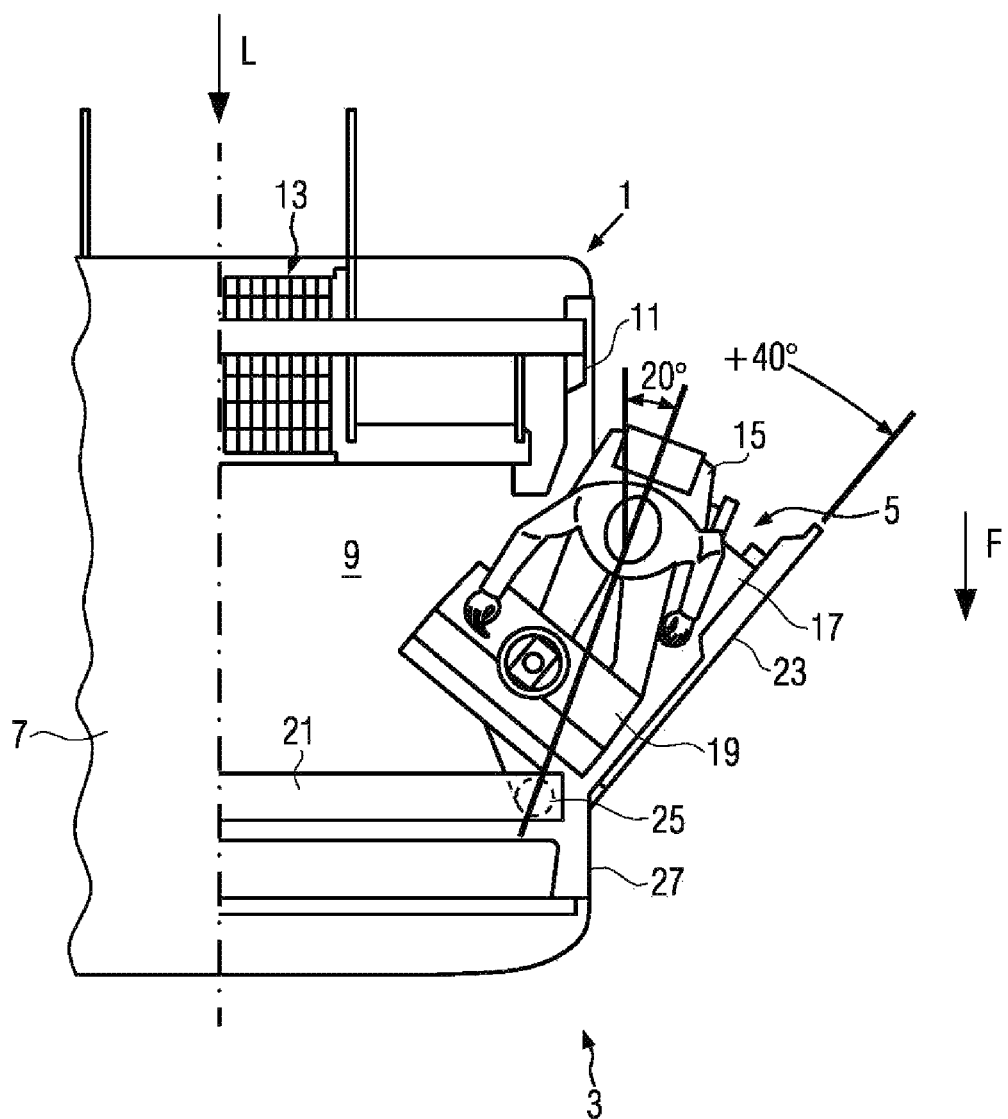
FIG. 1 shows a schematic plan view of a first embodiment of a control platform with a seat console with a control panel swiveled to the outside.

FIG. 1 shows a schematic plan view of a first embodiment of a control platform 1 of a construction machine 3, for example a road finishing machine, with a seat console 5 which is swiveled to the outside. The control platform 1 is covered by a roof 7 which is represented in the left half of the picture. The control platform 1 includes a bottom 9 and lateral delimitations 11 in the form of a grid, a wall, a railing or the like as a fall protection. In a rear region of the control platform 1, steps 13 for entering the control platform 1 are usually provided. The seat console 5 includes a seat 15, a console bottom 17 and, in this embodiment, a control panel 19 for controlling the machine functions, whereas in other embodiments, the control panel 19 can also be firmly installed at a front side 21 of the control platform 1, so that the control panel 19 does not swivel along with the seat console 5. Equally, the control panel 19 could be arranged at an element of the control platform 1 separately from the seat console 5 in a rotating manner. The seat console 5 in this embodiment comprises a wall structure 23 which serves as a fall protection just as the lateral delimitations 11 both in the shown state swiveled to the outside and when the seat console 5 is not in a swiveled state, that means when it is essentially parallel to the direction of travel F or a longitudinal axis L of the control platform 1.

In this embodiment, the seat console 5 is hinged to a structural element of the control platform 1 laterally by means of a swivel mechanism 25 in such a way that it can be swiveled to the outside over an outer edge 27 of the bottom 9 of the control platform 1. By the rotatability of the seat 15, however, the driver can sit laterally offset, but in parallel to the direction of travel and look to the front unhindered by front vehicle body parts in order to monitor a loading operation, for example. In this representation, the seat console is swiveled to the outside by about 40 degrees, and the seat 15 is rotated such that it is rotated about 20 degrees with respect to the direction of travel F. Suitably, the seat console 5 is designed such that its wall structure 23 is flush with the rest of the lateral delimitation 11 when the seat console 5 is in the non-swiveled position, that means parallel to the direction of travel F or swiveled by 0 degrees, respectively.

Figure 2:
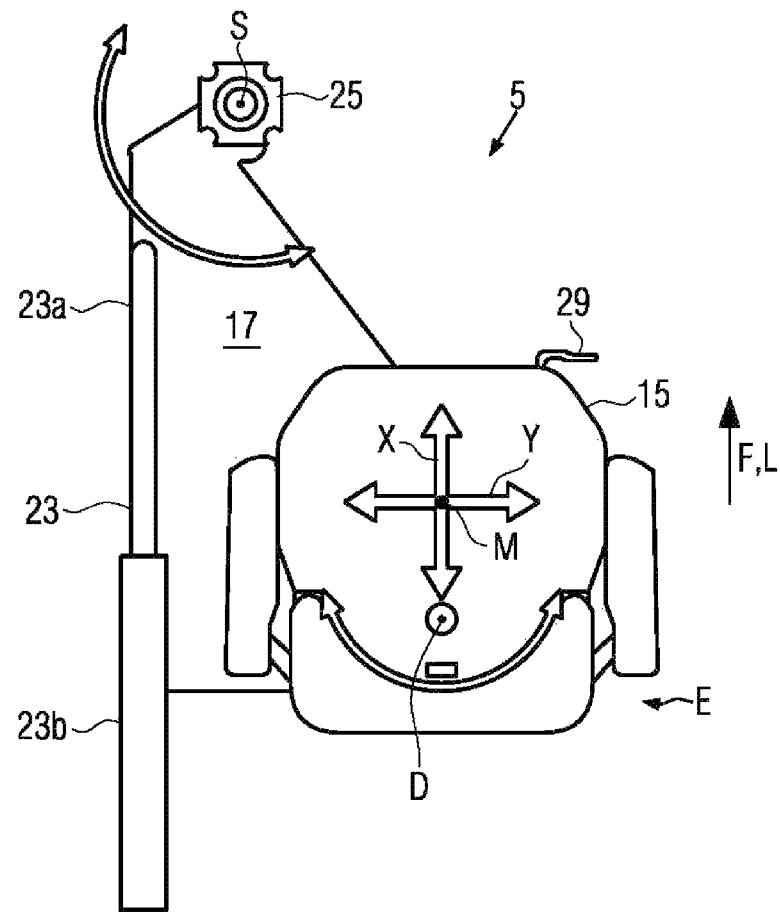
FIG. 2 shows a schematic plan view onto a seat console without control panel of a second embodiment of a control platform.

FIG. 2 shows a schematic plan view onto a seat console 5 without control panel 19 in a second embodiment of a control platform 1. The console bottom 17 is embodied at a right side of the seat console 5 in a manner tapering from a rear end E of the seat console 5, seen in the direction of travel F, to the front to the swivel mechanism 25. The wall structure 23 can include different regions, for example, a front region 23a which is embodied as a stable pane of safety glass or plastic, and a rear region 23b which is embodied as a steel railing. The different elements can also be combined in a different arrangement, as is shown, for example, in FIG. 4. The seat console can be swiveled about a swivel axis S by means of the swivel mechanism 25. The seat 15 can be rotated about an axis of rotation D and be shifted into a first direction X and a second direction Y by first and second linear shifting mechanisms. The axis of rotation D is offset from a center M of the seat 15. If the seat console 5 is, as in the shown illustration, in a non-swiveled, first position, the first direction X is essentially parallel to the direction of travel F or the longitudinal axis L of the control platform 1, and the second direction Y is essentially perpendicular thereto. If the shiftings or the rotation of the seat 15 are not each effected by a motor drive, for example an electric motor, one or more levers 29 can be provided by which the operator can release a respective arrest of the shifting or rotary mechanisms to then change the sitting position. Equally, however, a rotation can, for example, also always be possible without having to release an arrest.

Figure 3:
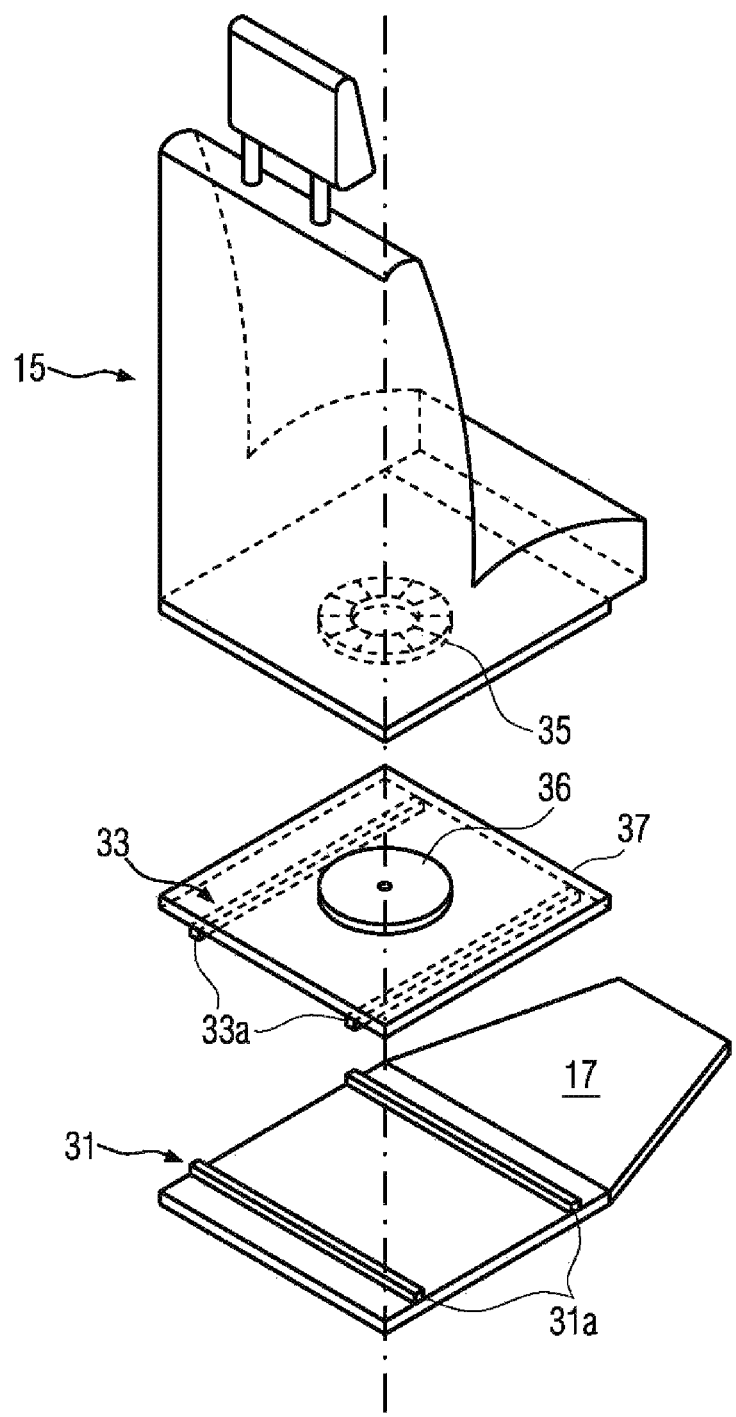
FIG. 3 shows a perspective side view onto a seat of a third embodiment of a control platform.

FIG. 3 shows a perspective side view as an exploded view onto a seat 15 of a third embodiment of a control platform 1. On the console bottom 17, a first linear shifting mechanism 31 is arranged in the form of a first rail system 31a. A second shifting mechanism 33 is connected thereto in the form of a second rail system 33a. A rotary mechanism 35 permits the rotation of the seat 15. To this end, a motor drive 36 can be provided which is arranged to rotate the seat 15 relative to the console bottom 17 when it is correspondingly activated. To combine the adjusting mechanisms 31, 33, 35 with each other as represented, an intermediate plate 37 can be provided. The rail systems 31a and 33a can be mounted directly one upon the other, however, a further intermediate plate can also be provided. The shifting mechanisms 31, 33 each comprise a rail system 31a, 33a which each in turn comprise two lower rail parts and two upper rail parts. For a better overview, here, only two linear elements per shifting mechanism 31, 33 are shown.

Figure 4:
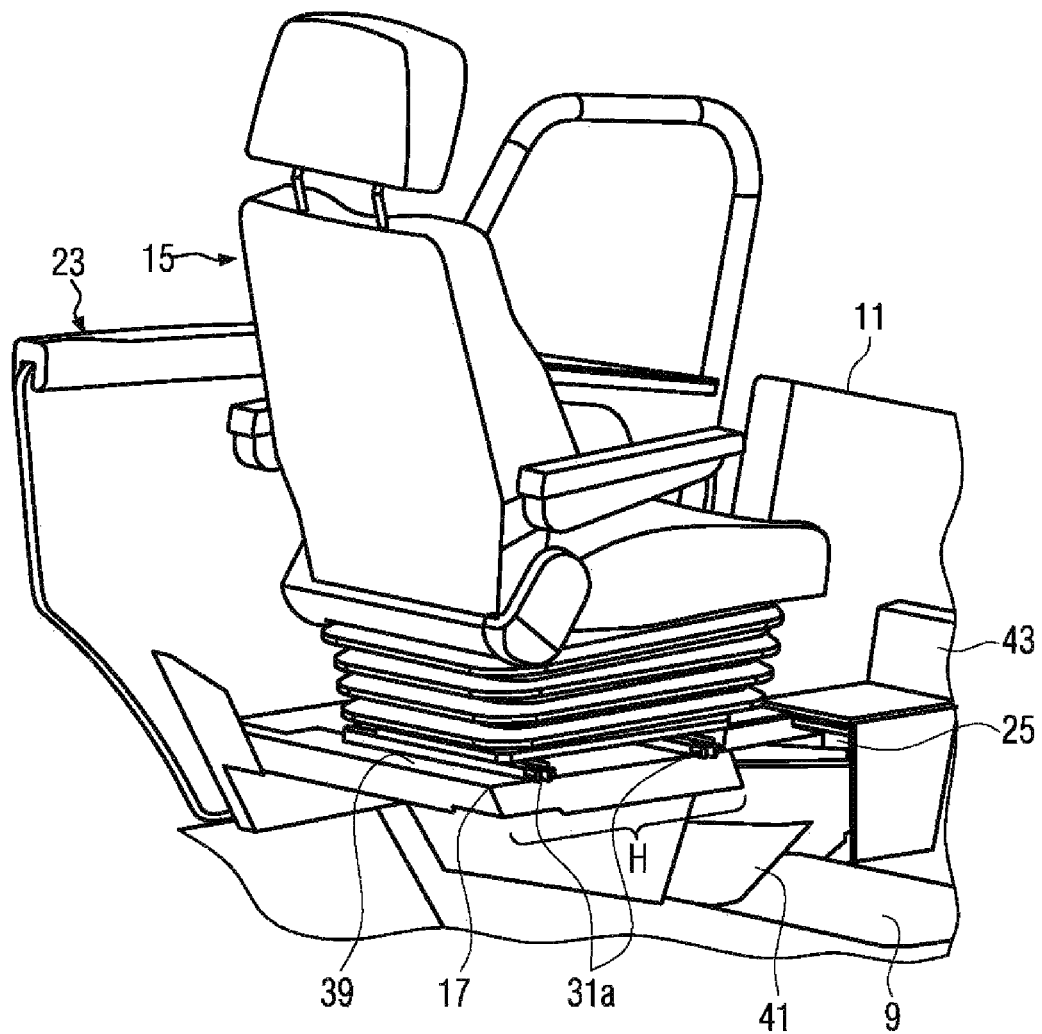
FIG. 4 shows a perspective side view onto a seat console of a fourth embodiment of a control platform.

FIG. 4 shows a perspective side view onto a seat console 5 of a fourth embodiment of a control platform 1. In this embodiment, the console bottom 17 includes a first level 39 and a second level 41 which are arranged at different heights.

The seat 15 is arranged on the elevated level 39 via the first rail system 31a. As can be seen, two linear elements each of the rail system 31a are firmly mounted on the level 39, and two linear elements are mounted at the rest of the seat assembly, the elements being mounted to be shiftable with respect to each other. The wall structure 23 is designed as a pane with an upper border. The swivel mechanism 25 is hinged to a structural element 43 so that the seat console 5 can be swiveled relative to the same. The structural element 43 can be a front wall of the control platform 1 or a comparable, essentially vertical structure. Equally, the structural element 43 can be a part of the bottom 9 of the control platform 1, so that the swivel mechanism 25 is directly mounted to the bottom 9. Equally, however, other arrangements could also be provided. In this embodiment, one can see that a rear half H of the seat console 5 is freely suspended. The elevated level 39 of the console bottom 17 is in this example connected to the wall structure 23 in the rear section. The mounting of the seat console 5 and thus the introduction of the gravitational force of the seat console 5 and an operator located thereon into the rest of the structure of the control platform 1, however, is effected only by the swivel mechanism 25 in this example.

Starting from the above represented embodiments of a control platform 1 with a seat console 5, many modifications thereof are possible. For example, it would be conceivable to attach a fold-out, extendable or swivable bracing to the rear end E of the seat console 5, so that there, too, a fall protection is provided. This bracing, for example a telescopic rod, could here be connected to the lateral delimitation 11 of the control platform 1 and the wall structure 23 of the seat console 5. It would furthermore be possible, if the rotary mechanism 35 and the swivel mechanism 25 are motor-driven, to automatically track, during a swiveling-out of the seat console 5, the seat 15, so that it is always oriented in parallel to the longitudinal axis L, that means that the viewing direction of the driver points to the front. In addition, a height adjustment of the seat 15 and further high-convenience elements, such as a suspension, an adjustment of the hardness of the upholstery, a seat heater and the like can be provided for the seat 15.

What is claimed is:

1. A control platform for a construction machine, the control platform comprising a structural element and a seat console, which includes a console bottom and a seat, wherein the seat console includes a rotary mechanism by which the seat is mounted to be rotatable relative to the console bottom, the seat console includes a first linear shifting mechanism and a second linear shifting mechanism by which the seat is mounted on the console bottom to be shiftable in a first direction and a second direction, and the seat console is hinged to the structural element by a swivel mechanism so that the seat console is able to swivel relative to the structural element, and wherein an essentially vertical wall structure is disposed at a rear portion of the seat console which is provided as a lateral delimitation of the control platform, and the wall structure extends above the console bottom and along a side of the seat.

2. The control platform according to claim 1, wherein the first linear shifting mechanism comprises a first rail system, and the second linear shifting mechanism comprises a second rail system, the first and the second rail systems being arranged perpendicularly with respect to each other.

3. The control platform according to claim 2, wherein the first rail system is arranged in parallel to a longitudinal axis of the control platform and thus to a direction of travel of the construction machine when the seat console is in a first position and mounted on the construction machine.

4. The control platform according to claim 1, wherein an axis of rotation of the rotary mechanism and a swivel axis of the swivel mechanism are arranged offset with respect to each other.

5. The control platform according to claim 1, wherein the seat console is configured to swivel relative to the structural element within a range of 0 to 45 degrees.

6. The control platform according to claim 1, wherein the rotary mechanism is arranged such that its axis of rotation is located offset from a center of the seat, so that the seat is mounted to be eccentrically rotatable.

7. The control platform according to claim 1, wherein the seat console comprises a control panel.

8. The control platform according to claim 1, wherein the console bottom includes two or more levels which are arranged at different heights with respect to each other.

9. The control platform according to claim 1, wherein the console bottom has a shape tapering at least on one side from a rear end of the seat console to the swivel mechanism.

10. The control platform according to claim 1, wherein the seat console is embodied to be freely suspended in a rear half.

11. The control platform according to claim 1, wherein the swivel mechanism is arranged such that the seat console is at least partially pivotable to an outside over an outer edge of a bottom of the control platform.

12. The control platform according to claim 1, wherein at least for one of the first or second linear shifting mechanism, the rotary mechanism or the swivel mechanism a motor drive is provided.

13. The control platform according to claim 12, wherein at least one setting of the first or second linear shifting mechanism or of the rotary mechanism, or of the swivel mechanism can be automatically adjusted.

14. A construction machine comprising the control platform according to claim 1.

15. The construction machine according to claim 14, wherein the construction machine is a road finishing machine or a feeder vehicle.

16. The control platform according to claim 1, wherein the seat has a seat bottom, and the wall structure extends above the seat bottom.

17. The control platform according to claim 1, wherein an outer portion of the console bottom is connected to an inner surface of the wall structure.

18. The control platform according to claim 1, wherein the wall structure comprises a rear region disposed at the rear portion of the seat console, and a front region that extends in front of the rear region.

19. A control platform for a construction machine, the control platform comprising a structural element and a seat console, which includes a console bottom and a seat, wherein the seat console includes a rotary mechanism by which the seat is mounted to be rotatable relative to the console bottom, the seat console includes a first linear shifting mechanism and a second linear shifting mechanism by which the seat is mounted on the console bottom to be shiftable in a first direction and a second direction, and the seat console is hinged to the structural element so that the seat console is able to swivel relative to the structural element, and wherein an upright wall structure is disposed along a rear portion of the seat console, the wall structure defines a lateral delimitation of the control platform, and the wall structure serves as a fall protection along a side of the seat.

20. The control platform according to claim 19, wherein the seat console is configured to swivel between a first non-swiveled state and a second state in which the seat console is swiveled outwardly with respect to a bottom of the control platform, the wall structure extends rearward of the seat when the seat console is in the first non-swiveled state, and the wall structure extends above the console bottom.

* * * * *